Oct. 22, 1957　　　　J. E. DELANEY　　　　2,810,200
SNAP GAUGE
Filed March 29, 1954　　　　　　　　　　　2 Sheets-Sheet 2
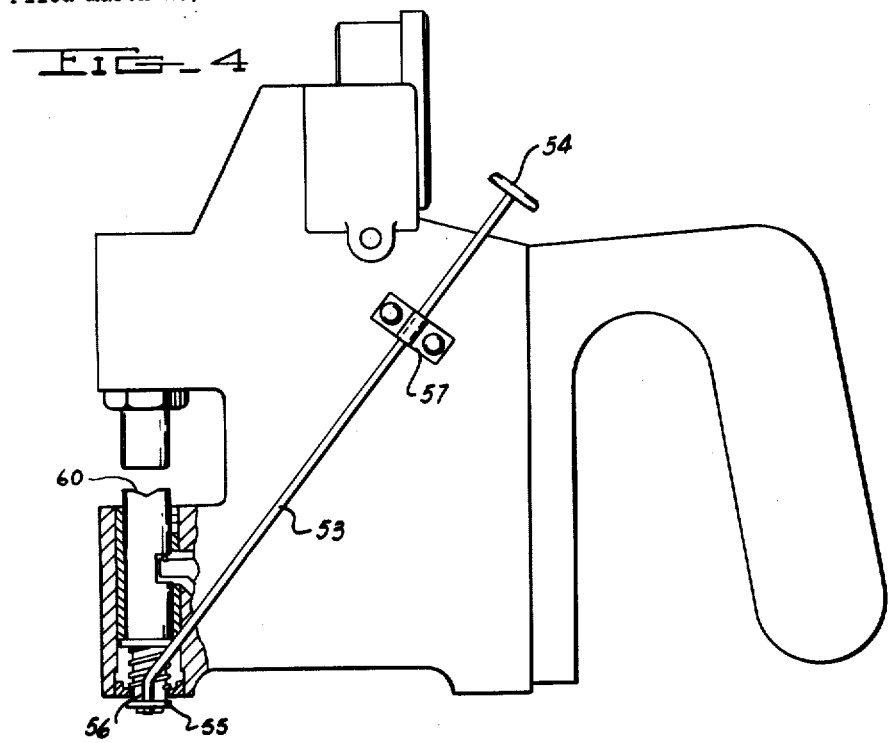
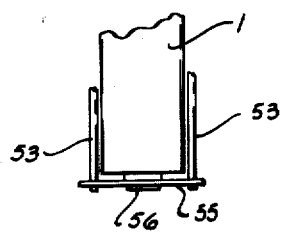
INVENTOR.
JOHN E. DELANEY
BY *Smith, Olsen & Kotts*
ATTORNEYS

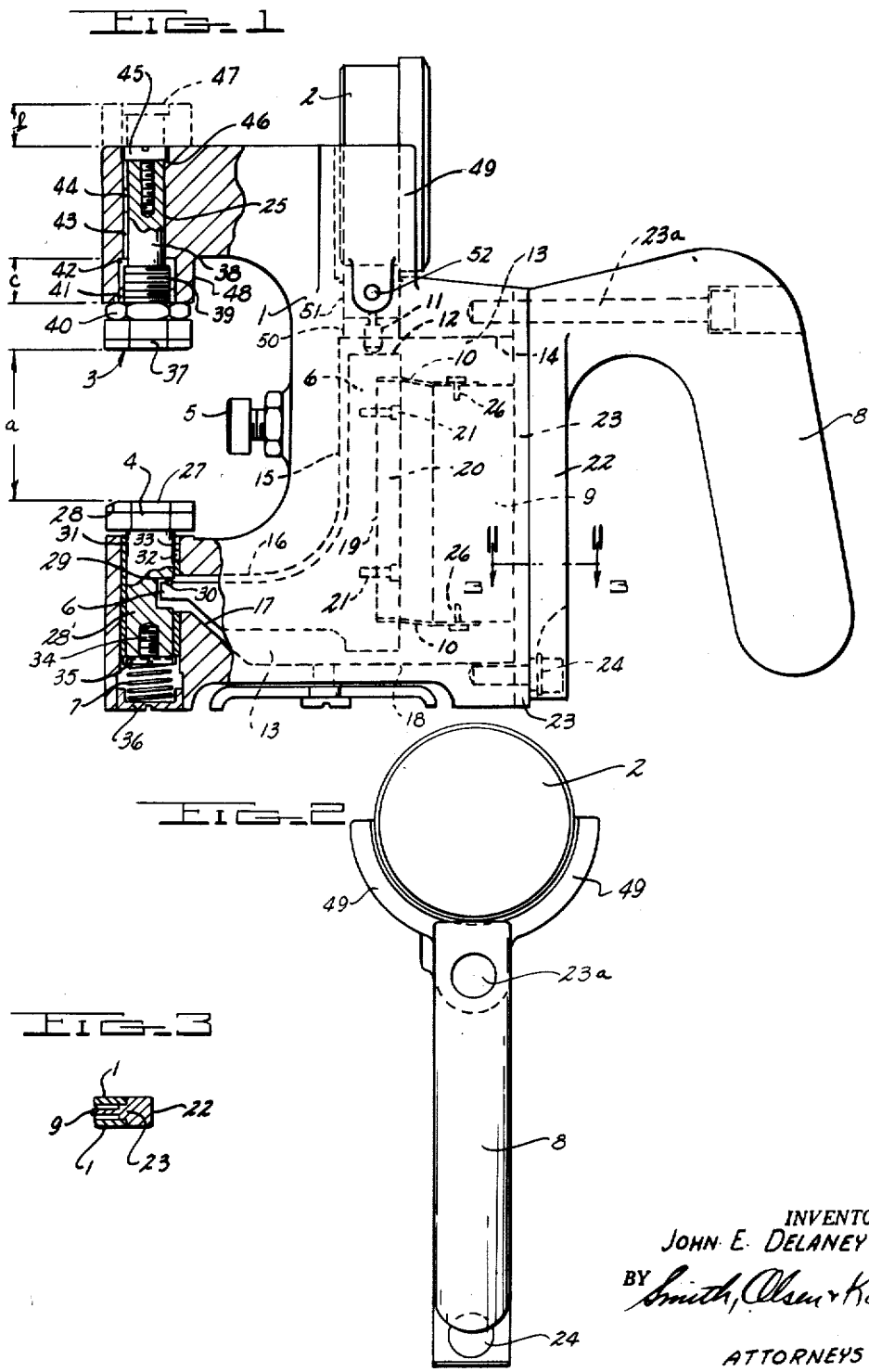

United States Patent Office 2,810,200
Patented Oct. 22, 1957

2,810,200

SNAP GAUGE

John E. Delaney, Dearborn, Mich., assignor to Lincoln Park Industries, Inc., Lincoln Park, Mich., a corporation of Michigan Application March 29, 1954, Serial No. 419,429

6 Claims. (Cl. 33—147)

My invention relates to gauges for determining the thickness of metal parts. It finds its greatest utility when calibrated with respect to a desired thickness of part. Other metal parts can then be inserted in the gauge to determine their variations in dimension with respect to the desired thickness.

One object of this invention is to produce a gauge wherein frictional drag between the traveling anvil and dial indicator is kept to a minimum.

Another object is to provide an adjusting means for a stationary anvil which will perform its adjusting function and at the same time prevent the anvil from turning or wobbling in its socket.

Another object is to provide a housing for the gauge which can be used in the manufacture of more than one size gauge, thereby requiring a lesser number of housings while producing a complete range of gauge sizes.

Another object is to provide an anvil with a depression in its head to accurately position the work and at the same time provide means for quickly and easily retracting the head to release the work from the depression.

Other objects of this invention will appear in the following description and appended claims, reference being had to the accompanying drawings forming a part of this specification wherein like reference characters designate corresponding parts in the several views.

In the drawings:

Fig. 1 is a side elevation of the gauge with parts cut away to show constructional details of the anvils.

Fig. 2 is an end elevation of the gauge of Fig. 1.

Fig. 3 is a view taken on line 3—3 of Fig. 1.

Fig. 4 is a side elevation of a modified form of gauge.

Fig. 5 is an end elevation of a lower portion of the gauge illustrated in Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring more specifically to Figs. 1 and 2, the snap gauge there illustrated consists essentially of a yoke-shaped housing 1, a dial indicator mechanism 2 (of conventional construction), a stationary anvil 3, a traveling anvil 4, a second stationary anvil 5, an L-shaped bar 6 between anvil 4 and indicator mechanism 2, a compression spring 7 for urging anvil 4 upward, a hand grip 8 bolted on the housing, a rectangular mounting plate 9 integrally formed with the hand grip, and a pair of leaf springs 10 between bar 6 and plate 9 for floatably supporting bar 6 within housing 1.

Before describing the component parts of the gauge in any great detail the function and operation of the essential parts will be explained. In operation, the piece of work is inserted between anvils 3 and 4 until it abuts against anvil 5. Anvil 4 will be depressed and cause bar 6 to move downward. Dial indicator mechanism 2 has a depressible stem 11 which, when no work is positioned in the gauge, will press against upper face 12 of bar 6. As bar 6 moves downward (due to the depression of anvil 4) stem 11 will move downward to cause rotation of a pointer mechanism (not shown) within indicator mechanism 2. The extent to which the pointer is rotated serves to indicate the thickness of work being tested. By the use of standard size workpieces the indicator mechanism can be calibrated to indicate the extent to which a piece is oversize or undersize with respect to the thickness of the standard piece.

Going into greater detail with respect to the disclosed construction, housing 1 will be seen to have a hollow portion 13 defined by surfaces 14, 15, 16, 17 and 18. Bar 6, which is disposed within this hollow portion, is notched out at 19 to receive a clamping bar 20. Leaf springs 10 are clampingly positioned between bars 6 and 20 at the upper and lower limits of notch 19. Screws 21 retain clamping bar 20 in place on bar 6. The opposite ends of springs 10, 10 are anchored on plate 9 with screws 26, 26. Integrally formed with plate 9 is a vertical closure plate 22 having a portion 23 of reduced width received between the opposing side walls of housing 1. Handle 8 extends from extension 23. Preferably handle 8, closure plate 22, and mounting plate 9 are formed as a single casting.

Assembly of bar 6 within housing 1 is accomplished by first positioning springs 10, 10 in the upper and lower extremities of notch 19 and screwing plate 20 into place within the notch. The free ends of springs 10 are then fastened on the upper and lower extremities of plate 9 with screws 26. Bar 6, springs 10, plate 9 and handle 8 can now be handled as a single unit. It is thus a simple process to insert bar 6 within the hollow portion of housing 1 and secure the unit in place with screws 23a and 24.

Referring now to traveling anvil 4, it will be seen that there is provided an anvil piece 27 having a beveled face 28 to facilitate insertion of the work into the gauge. Integral with piece 27 is shaft 28', a portion of which is cut away at 29 to form a bearing surface for hardened steel ball 30 imbedded in one end of bar 6. Proper guiding of shaft 28' is provided by sleeve bearing 31 imbedded in housing 1. In order that beveled face 28 will always be in proper position to perform its work guiding function, means is provided for preventing rotation of the anvil piece. This means takes the form of a straight keyway 32 cut in bearing 31 and a key 33 projecting from shaft 28'. Screw 34 is threaded into the lower end of shaft 28' and has a concave head 35 for receiving one end of compression spring 7. The other end of the spring is received within a hollowed out portion of screw 36.

It is contemplated that spring 7 will provide enough force to maintain the traveling anvil in engagement with the work. Springs 10, 10 are designed primarily to serve as a suspending device for bar 6. The advantage in this type of suspension is that it obviates the use of friction-producing guides which would otherwise be required to insure straight-line motion of bar 6. Springs 10, 10 will also maintain ball 30 in contact with the upper face of cut away portion 29 thereby permitting a loose fit between arm 6 and shaft 28' but at the same time preventing any play therebetween.

Anvil 5 has a threaded shaft formed integrally therewith for reception in a threaded opening (not shown) in housing 1. A nut is provided for adjusting the position of the anvil.

Anvil 3, mounted within a bored out portion 42 of housing 1, includes an anvil piece 37 integrally formed on the lower end of shaft 38, a first portion 25 of which is smooth-faced and a second portion 39 of which is threaded for receiving internally threaded nut 40. This nut has a portion 41 of reduced diameter for snugly fitting within bore 42. The snug fit between bore 42 on the one hand and the smooth-faced portions of shaft 38 and nut 40 on the other hand will prevent any play which otherwise might exist. Straight keyway 43, formed in the housing, and key 44, projecting from shaft 38, prevent the shaft from turning. Screw 45, which is threaded into the upper end of shaft 38, has its head in engagement with shoulder 46 thereby releasably retaining shaft 38 against downward movement. Anvil 3 may be adjusted downwardly by loosening screw 45 and tightening nut 40.

In order that the same housing 1 can be used in the manufacture of more than one size gauge the housing is originally cast with a first projection 47 (shown in dotted lines), and a second projection 48. If the housing is to be used in the manufacture of a small size gauge projection 47 will be cut off but if the housing is to be used in the manufacture of a large size gauge projection 48 will be cut off. Thus, if distance $a$ were 1½ inches, distance $b$ were ½ inch and distance $c$ were ½ inch and it was desired to manufacture a 2 inch gauge, projection 48 would be cut off. If it were desired to manufacture a 1½ inch gauge, projection 47 would be cut off. Intermediate size gauges could be manufactured by cutting off portions of the projections. Projection 47 is necessary in order that shaft 38 can be made of a standard length no matter what size gauge is being manufactured.

Indicator mechanism 2 is cradled within a semicircular seat formed by curved arms 49, 49. Extending downwardly from the low point of the cradle (and communicating with hollow portion 13) is a circular passageway 50, in which is received a shaft 51 carried by the indicator mechanism. Set screw 52 snugly holds the shaft in the passageway. Stem 11 is mounted for reciprocating movement within shaft 51.

When the work to be gauged is circular in cross section the traveling anvil is preferably formed with a V-notch in its upper face (as shown in Fig. 4) to retain the work in gauging position. The gauge illustrated in Figs. 4 and 5 is the same as that illustrated in Figs. 1 through 3 except for the V-notch or depression 60, the absence of a chamfered leading edge on the movable anvil, and the fact that manually operable means has been provided to retract the traveling anvil. This means includes a flexible rod or wire 53 leading from push button 54 to cross head 55. The traveling anvil has an extension 56 connected at its lower end to cross head 55. Guide bracket 57 retains rod 53 in place on the housing. It can be seen that a manual push on button 54 will cause extension 56 to move down and retract the anvil.

From the foregoing it can be seen that a gauge has been devised wherein frictional drag between the traveling anvil and dial indicator is kept to a minimum, the stationary anvil is both adjustable and wobble-free, the gauge housing is adapted for manufacturing more than one size gauge, and the traveling anvil is easily retractable for release of the work.

Having thus described my invention, I claim:

1. In a gauge the combination comprising; a support; a stationary anvil on said support; a traveling anvil mounted on said support in opposing relation to said stationary anvil; spring means positioned directly between said support and traveling anvil in axial alignment with said traveling anvil for urging said traveling anvil toward said stationary anvil; a dial indicator mounted on said support; bar means between said traveling anvil and said indicator for translating movement of said anvil into a visual indication on said dial; and a pair of parallel leaf springs of substantially the same length positioned between said support, and said bar means for floatably maintaining said bar means out of contact with said support to thereby establish a frictionless connection between said traveling anvil and said dial indicator.

2. In a gauge the combination comprising; a housing; a stationary anvil on said housing; a traveling anvil mounted on said housing in opposing relation to said stationary anvil; spring means positioned directly between said housing and traveling anvil urging said traveling anvil toward said stationary anvil; a dial indicator mechanism mounted on said housing; said housing having its interior hollowed out to define an L-shaped recess; an L-shaped bar within said recess, having one of its ends interconnected with said traveling anvil, and having the end furthest from said one end in operable engagement with said dial indicator mechanism whereby said bar will serve to translate movement of said traveling anvil into a visual indication on said dial indicator mechanism; a plate releasably secured on said housing for closing up the L-shaped recess; and a pair of parallel leaf springs of substantially the same length positioned between said plate and bar for floatably maintaining said bar out of contact with the walls of said housing whereby a frictionless connection is established between said traveling anvil and said dial indicator mechanism.

3. In a gauge the combination comprising; a support provided with a smooth-faced bore, a first section of which is of large diameter than a second section; an anvil head having a smooth-faced shaft portion snugly received within said second section and having a threaded portion positioned in said first section; a nut having internal threads meshing with said threaded portion and having a smooth outer face snugly engaging the wall which forms said first section; and a screw threadedly engaging the end of said shaft remote from said anvil head; said screw having a head of larger diameter than said second section; said smooth surfaces insuring a snug fit between said shaft and said bore to thereby prevent any lateral play of the shaft in the bore.

4. In a method of manufacturing a gauge housing the steps which comprise; forming a gauge housing with a mounting portion for a first anvil; providing an arm on said housing for mounting a second anvil in facing relation with respect to first anvil; extending a projection from the mounting portion on said arm toward the mounting portion for the first anvil; extending a projection from the mounting portion on said arm away from the mounting portion for the first anvil; and cutting away one of the projections to thereby vary the distance between the mounting portion on said arm and the mounting portion for the first anvil without changing the thickness of the mounting portion on the arm.

5. In a gauge the combination comprising; a housing; a stationary anvil on said housing; a traveling anvil mounted on said housing in opposing relation to said stationary anvil; spring means between said housing and traveling anvil urging said traveling anvil toward said stationary anvil; a dial indicator mounted on said housing; means between said traveling anvil and said indicator for translating movement of said anvil into a visual indication on said dial; said traveling anvil having a depression formed in its face for accurately positioning the work with respect to the stationary anvil; and manually operable means for retaining said traveling anvil against the action of said spring means; said retracting means including a flexible push rod having one of its ends connected directly to said traveling anvil and having the other of its ends connected to a push button, and a guide means on said housing for slidably retaining said rod thereon.

6. In a gauge the combination comprising a housing, a stationary anvil on said housing, a traveling anvil mounted on said housing in opposed relation to said stationary anvil, spring means positioned directly between said housing and traveling anvil urging said traveling anvil toward said stationary anvil, arcuately contoured seating means formed on said housing, a dial indicator mechanism positioned in said seating means, said housing having its interior hollowed out to define a recess, a bar within said recess having one of its ends interconnected with said traveling anvil and having another of its ends in operable engagement with said dial indicator mechanism, a combined closure plate and hand grip unit releasably secured on the housing for closing up the aforementioned recess, and a pair of parallel leaf springs of substantially the same length positioned between said plate and bar for establishing a frictionless connection between said traveling anvil and dial indicator mechanism.

References Cited in the file of this patent
UNITED STATES PATENTS

| | | |
|---|---|---|
| 1,394,974 | Danielsson | Oct. 25, 1921 |
| 1,624,654 | Brittain | Apr. 12, 1927 |
| 1,863,673 | Schraven | June 21, 1932 |
| 2,440,967 | Moore | May 4, 1948 |
| 2,551,059 | Shockley | May 1, 1951 |
| 2,580,009 | Emery | Dec. 25, 1951 |
| 2,607,999 | Stedman | Aug. 26, 1952 |
| 2,645,020 | Foster | July 14, 1953 |

U. S. DEPARTMENT OF COMMERCE
PATENT OFFICE

CERTIFICATE OF CORRECTION

Patent No. 2,810,200                                October 22, 1957

John E. Delaney

It is hereby certified that error appears in the printed specification of the above numbered patent requiring correction and that the said Letters Patent should read as corrected below.

Column 4, line 42, after "to" insert -- the --; line 62, for "retaining" read -- retracting --.

Signed and sealed this 15th day of April 1958.

(SEAL)
Attest:
KARL H. AXLINE
Attesting Officer

ROBERT C. WATSON
Commissioner of Patents